Figure 1:
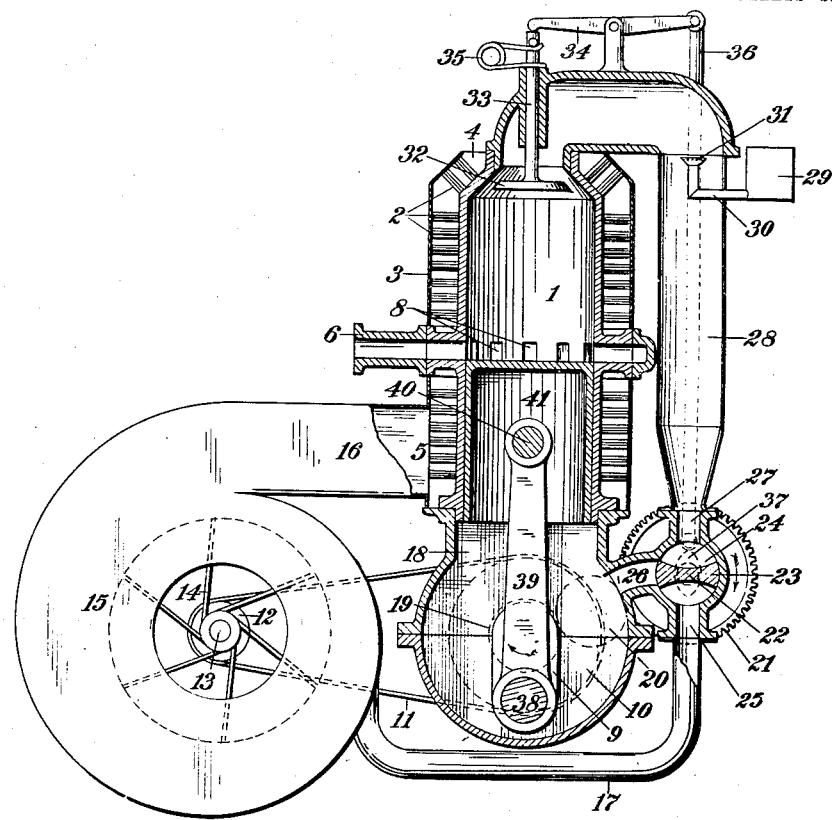
Figure 3:
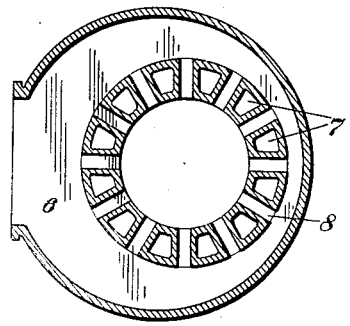
Figure 4:
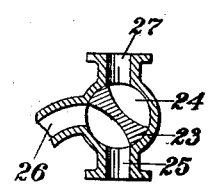
Figure 5:
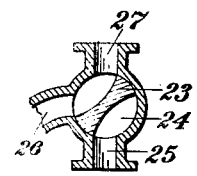
Figure 2:
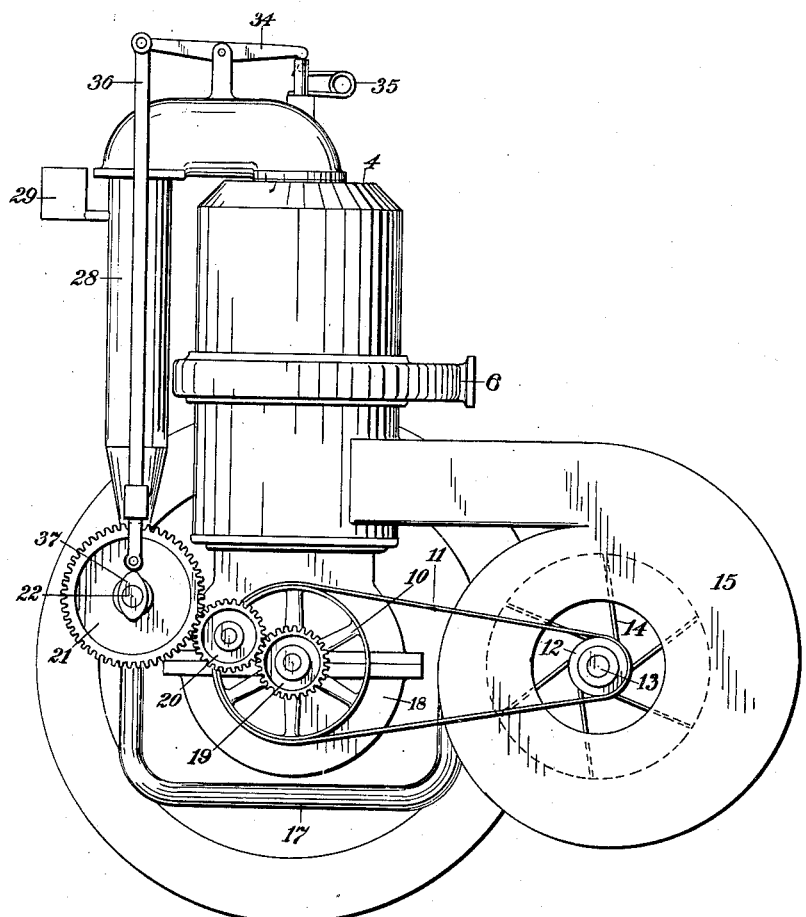

No. 866,654. PATENTED SEPT. 24, 1907.
V. JAKOB.
TWO CYCLE GAS ENGINE.
APPLICATION FILED JULY 31, 1906.

2 SHEETS—SHEET 1.

WITNESSES:
P. Rogers
Erdis Robinson

Victor Jakob INVENTOR.

BY Geo. W. Rightmire
ATTORNEY.

No. 866,654. PATENTED SEPT. 24, 1907.
V. JAKOB.
TWO CYCLE GAS ENGINE.
APPLICATION FILED JULY 31, 1906.

2 SHEETS—SHEET 2.

WITNESSES:
R. Rogers
Erdis Robinson

Victor Jakob INVENTOR.
BY
Geo. W. Rigsbinning
ATTORNEY.

UNITED STATES PATENT OFFICE.

VICTOR JAKOB, OF COLUMBUS, OHIO.

TWO-CYCLE GAS-ENGINE.

No. 866,654.　　　Specification of Letters Patent.　　　Patented Sept. 24, 1907.

Application filed July 31, 1906. Serial No. 328,556.

*To all whom it may concern:*

Be it known that I, VICTOR JAKOB, a subject of the Emperor of Germany, residing at Columbus, in the county of Franklin and State of Ohio, have invented certain new and useful Improvements in Two-Cycle Gas-Engines, of which the following is a specification.

My invention relates to improvements in a two-cycle internal combustion motor and has especial reference to the means of furnishing air to the crank case, whence it issues, upon the downward stroke of the piston, to mingle with the fuel, preparatory to the admission of the mixture into the cylinder.

In my improved device, the air is forced under a pressure higher than the atmospheric pressure into the crank chamber; consequently, the volume of the air thus forced in, if at atmospheric pressure only, would exceed the piston displacement.

It further contemplates a series of exhaust ports arranged around the entire circumference of the cylinder, instead of the usual continuous port, taking up part of the circumference.

It also contemplates the use of a jacket incasing the cylinder, leaving a space between, into which project spines to increase the cooling effect, which is produced by forcing a current of cool air between the jacket and casing and through openings which lie between the exhaust port walls.

It contemplates further the employment of mechanically operated valves controlling the admission to the crank chamber, the exit therefrom into the mixture pipe, and the inlet into the cylinder.

It further contemplates the employment of a circumferential jacket surrounding the exhaust ports, into which said ports open, which jacket at one or more points in its circumference communicates with the outer atmosphere; it comprises further the novel features and the arrangement and combination of parts hereinafter set forth.

In the accompanying drawings which are hereby made a part of the specification, Figure I is a vertical sectional view of one cylinder, with its connections, of my two-cycle engine; Fig. II is a view from the side opposite to that shown in Fig. I in which the gearing connections are shown; Fig. III, is a horizontal sectional view through the exhaust ports and jacket; Fig. IV illustrates the position of the rotating valve to admit air into the crank case; Fig. V illustrates the position of the rotating valve to admit air from the crank case into the pipe leading to the intake port.

Referring to the accompanying drawings, in which the same reference numerals indicate like parts throughout, 1 is a cylinder provided upon its circumference with splines 2 which are preferably irregular in cross section, to afford more surface for radiation and convection, whereby the cooling effect is greatly increased. 3 is a jacket surrounding the cylinder which is open at the top as indicated at 4. The air is admitted to the jacket at one side thereof near the lower end as shown at 5, and inasmuch as the air is traveling at a high rate it immediately encircles the cylinder and there being no escape at the bottom, it travels rapidly towards the top; in its upward travel it strikes the spines and is deflected and the current is broken up, thereby greatly increasing the cooling effect upon the cylinder by accelerating convection. Surrounding the cylinder at an appropriate point is a jacket 6 which cuts off the communication between the lower and upper parts of the cylinder casing except through the openings 7 which are most clearly shown in Fig. III; in this manner the volume of cooling air is forced through the openings between the exhaust ports 8, which are therefore almost surrounded by the cooling air, the especially beneficial effect of which arrangement will hereinafter be set forth. It is seen that the cooling arrangement provides for greatly increased heat dispersing surfaces, for the directing of a volume of driven air around the cylinder, and for confining the same within a casing, whereby it is forced upwardly until it passes out at the top.

The air for cooling the engine is furnished in the following manner: To crank shaft 9 is keyed a pulley 10 which is connected by a belt 11 to the pulley 12 mounted upon a shaft 13; this shaft 13 carries the blower wheel 14 which is inclosed by the casing 15, which latter is connected with the casing surrounding the cylinder by the pipe 16. As the crank shaft is driven by the operation of the engine the blower will be actuated, and the speed of the blower may be increased or decreased as compared with the speed of rotation of the crank shaft, by regulating the comparative sizes of the pulleys in a well known manner. The casing 15 also opens into a second pipe 17, which conducts a current of air into the crank chamber 18 in the following manner:—

Keyed upon the crank shaft 9 is a pinion 19 meshing with pinion 20, which in turn meshes with gear 21 mounted upon the cam shaft 22, adapted to drive said shaft. Mounted upon the cam shaft 22 is a valve 23 arranged to rotate therewith in the chamber 24; this chamber has three openings shown at 25, 26, and 27. Pipe 17 connects with the opening 25, and when the valve is positioned as shown in Fig. IV, a continuous passage is afforded from the pipe 17 through the opening 25 into the chamber 24 and through the opening 26 into the crank chamber; when the rotating valve is positioned as shown in Fig. V a continuous passage is made from the crank chamber through the chamber 24 and through the opening 27 into the mixture pipe 28. In this manner the air driven by the blower at a high rate of speed will be forced into the crank chamber in a greater volume than if it were admitted therein under normal atmospheric pressure, and this volume being still further compressed by the piston as hereinafter explained will insure a flow of fresh air into the mixture pipe.

The carbureter is shown conventionally at 29, the pipe 30 leading therefrom into the mixture pipe, the fuel passing through the sprayer or atomizer 31. The combustible mixture is admitted to the cylinder head around the puppet valve 32, the stem 33 of which is adapted to be actuated by the beam 34. The spring 35 is provided for compelling the seating of the valve under normal conditions. To beam 34 is secured a push rod 36 which is adapted to be operated by the double cam 37 mounted on the cam shaft 22, this double cam arrangement compelling two operations of the valve 32 for each rotation of the cam shaft. The manner of actuating the cam shaft has been described above; in the selection of pinions it is necessary to reduce from the crank shaft to the cam shaft so that one rotation of the cam shaft takes place during two rotations of the crank shaft, whereby the puppet valve 32 will be forced open once during each rotation of the crank shaft.

To the crank pin 38 is linked one end of the connecting rod 39, which, at its other end is hinged to the wrist pin 40 of the piston 41. The position of the piston shown in Fig. I is at the end of the working stroke, at which point the exhaust ports 8 are completely uncovered; the puppet valve 32 is opened at the same time, so that a new charge of the combustible mixture enters at the moment that the pressure within the cylinder is reduced practically to atmospheric pressure. It is understood that the crank case and cylinder must be secured together air tight and the crank shaft must also have air tight bearings.

The operation of my improved engine is as follows: The crank shaft is started in the usual manner by a detachable crank from the outside of the crank chamber, and in describing the manner of operation of the parts I shall assume that the piston is starting on its downward stroke from the upper part of the cylinder. Assume that the crank chamber is filled with air, the manner of introducing the air being hereafter explained. The downward movement of the piston will force the air out from the crank chamber through the rotating valve which has the position shown in Fig. V; the air passes thence into the pipe 28 where it becomes charged with fuel from the atomizer 31, and the pressure increases until valve 32 opens. In moving downward the piston opens the exhaust ports 8 and the burned gases escape through these ports at great speed; before the piston completely uncovers the exhaust ports the pressure in the cylinder has become practically equal to the atmospheric pressure outside, and at this instant the puppet valve 32 is lifted through the action of one face of the double cam 37 on the cam shaft 22, which raises the push rod 36, thereby tilting the beam 34 and forcing downwardly the valve stem 33, thereby opening the inlet port. The combustible mixture rushes into the cylinder head on all sides of the puppet valve 32 and expels the burned gases remaining in the cylinder. The piston now starts on its upward stroke, first closing the exhaust ports, and by this time the puppet valve 32 is again seated, closing the inlet port; as the piston advances, the charge is compressed in the head of the cylinder and at the proper moment the ignition takes place, preferably by means of the electric spark in any well known manner, ignition means not being shown herein. Meanwhile the blower has been driven in the manner herein before described and a current of air has been forced from the blower casing 15 out through the pipe 17, and by the movement of the crank shaft the cam shaft has been so rotated as to position the valve 23 to open a passage way from pipe 17 into the crank chamber through the opening 25 and chamber 24, as illustrated in Fig. IV. The air admitted into the crank chamber during this operation of the piston is forced there into under such pressure as to completely fill the same and the cylinder below the piston. It is seen that the power of suction due to the upwardly moving piston is not in any degree relied upon for filling the crank chamber with fresh air, although this power of suction is the means used for accomplishing this purpose in the ordinary two cycle engine employing crank case compression. Further, the air from the crank chamber takes up the fuel as it passes the atomizer, and upon entering the cylinder assists in expelling the burned gases remaining therein; the action of the valves is so timed in relation to the movement of the piston that although the incoming charge aids in cleaning the cylinder yet a very slight amount of the fresh fuel is lost through the exhaust ports.

Air is constantly being driven by the blower into the cylinder casing among the spines on the cylinder, and as it passes upwardly it comes in contact with each exhaust port on two sides thereof, and exercises a very great cooling effect upon the metal surrounding the exhaust ports; this is accomplished by providing numerous ports in the circumference of the cylinder instead of one continuous port as is customary. The cylinder is further kept from being heated to the extent usual in two-cycle engines by the provision of the jacket 6 surrounding the cylinder and positioned opposite the exhaust ports, so that the highly heated exhaust passes directly into this jacket and is expelled therefrom out into the general atmosphere at one side thereof through the opening shown in Fig. III; this arrangement prevents the exhaust from passing along the circumference of the cylinder on the outside thereof. Therefore not only do I confine the expulsion of the burned gases to a limited area, but I also provide a cooling stream of air which is directed against the hot metal on each side of each exhaust port. The air used in cooling the cylinder after passing among the spines upwardly through the casing escapes into the general body of the atmosphere at the top thereof.

Having thus described my invention, what I claim as new and desire to secure by Letters Patent is:

1. In an explosive engine, a cylinder, a crank chamber opening thereinto, a reciprocating piston in said cylinder, means for forcing air into said crank chamber under high pressure during the compression stroke of the piston, a pipe leading from said crank chamber into the explosion end of said cylinder, through which pipe air is driven from the crank chamber during the return stroke of the piston, and means for admitting fuel into said pipe.

2. In an explosive engine, a cylinder, a crank chamber opening thereinto, a reciprocating piston in said cylinder, a blower, a pipe leading from said blower into said crank chamber, a pipe leading from said crank chamber into the explosion end of said cylinder, a rotary valve adapted to admit air driven by the blower into said crank chamber during the compression stroke of said piston, said valve being adapted to admit air from said crank chamber into said pipe leading into the explosion end of said cylinder during the return stroke of said piston, and means for admitting fuel into said last mentioned pipe.

3. In an explosive engine having a cylinder and a piston operating therein, a crank chamber opening into said cylinder, means for driving air at a high velocity into said crank chamber during the compression stroke of said piston, means for conducting said air outwardly from said crank chamber and into the explosion end of said cylinder during the return stroke of said piston, and means for causing fuel to mix with the air as it is being conducted to the cylinder head for combustion.

4. In an explosive engine, a cylinder, a crank chamber opening thereinto, a reciprocating piston in said cylinder, a blower, a pipe leading from said blower into said crank chamber, a pipe leading from said crank chamber into the explosion end of said cylinder, a mechanically operated rotary valve positioned to control the passage ways of said pipes to admit air into the crank chamber during the compression stroke of said piston, and to permit said air to be forced out into said pipe leading to the explosion end of said cylinder during the return stroke of said piston, and means for admitting fuel into said last mentioned pipe.

In testimony whereof I have affixed my signature in the presence of two witnesses.

VICTOR JAKOB.

Witnesses:
ARVILLA ROGER,
GEO. W. RIGHTMIRE.